US012545590B2

(12) United States Patent
Konnai

(10) Patent No.: US 12,545,590 B2
(45) Date of Patent: Feb. 10, 2026

(54) HALLOYSITE POWDER

(71) Applicant: JFE MINERAL COMPANY, LTD., Tokyo (JP)

(72) Inventor: Hidefumi Konnai, Tokyo (JP)

(73) Assignee: JFE MINERAL COMPANY, LTD., Tokyo (JP)

( * ) Notice: Subject to any disclaimer, the term of this patent is extended or adjusted under 35 U.S.C. 154(b) by 611 days.

(21) Appl. No.: 17/771,111

(22) PCT Filed: Oct. 26, 2020

(86) PCT No.: PCT/JP2020/040095
§ 371 (c)(1),
(2) Date: Apr. 22, 2022

(87) PCT Pub. No.: WO2021/085375
PCT Pub. Date: May 6, 2021

(65) Prior Publication Data
US 2022/0371903 A1    Nov. 24, 2022

(30) Foreign Application Priority Data
Oct. 28, 2019   (JP) ................................ 2019-195020

(51) Int. Cl.
| C01B 3/40 | (2006.01) |
| C01B 33/26 | (2006.01) |
| C01B 33/40 | (2006.01) |
| C04B 20/04 | (2006.01) |
| C04B 35/628 | (2006.01) |

(52) U.S. Cl.
CPC .............. *C01B 33/40* (2013.01); *C01B 33/26* (2013.01); *C04B 20/04* (2013.01); *C04B 35/62826* (2013.01); *C01P 2006/17* (2013.01)

(58) Field of Classification Search
None
See application file for complete search history.

(56) References Cited

U.S. PATENT DOCUMENTS 4,098,676 A    7/1978 Robson
11,180,375 B2 *  11/2021 Konnai .................. C01B 33/40
(Continued)

FOREIGN PATENT DOCUMENTS

CN    101795195 A    8/2010
CN    101844773 A    9/2010
(Continued)

OTHER PUBLICATIONS

Development of nano modified concrete for next generation storage systems (Year: 2018).*
(Continued)

*Primary Examiner* — Keling Zhang
(74) *Attorney, Agent, or Firm* — Buchanan Ingersoll & Rooney PC

(57) ABSTRACT

Provided is halloysite powder having a small b value. The halloysite powder is powder including a granule in which halloysite including halloysite nanotubes is aggregated, the granule has a first pore deriving from a tube hole of the halloysite nanotubes and a second pore different from the first pore, and the $Fe_2O_3$ content is not more than 2.00 mass %.

6 Claims, 2 Drawing Sheets

(56) References Cited

U.S. PATENT DOCUMENTS

| | | | | |
|---|---|---|---|---|
| 2006/0102871 | A1* | 5/2006 | Wang | B82Y 25/00 |
| | | | | 252/62.51 R |
| 2007/0202061 | A1 | 8/2007 | Riedlinger et al. | |
| 2007/0292459 | A1* | 12/2007 | Cooper | A61K 8/26 |
| | | | | 424/401 |
| 2012/0107214 | A1 | 5/2012 | Suh et al. | |
| 2018/0305543 | A1* | 10/2018 | Agrawal | D01F 6/06 |
| 2020/0062603 | A1* | 2/2020 | Konnai | C01B 33/40 |
| 2020/0123025 | A1* | 4/2020 | El-Masri | B01J 20/28007 |

FOREIGN PATENT DOCUMENTS

| | | | | |
|---|---|---|---|---|
| CN | 105789575 | A | | 7/2016 |
| CN | 107364872 | A | | 11/2017 |
| EP | 3530622 | A1 * | 8/2019 | ............ C01B 33/26 |
| EP | 3533761 | A1 | | 9/2019 |
| JP | H02-004452 | A | | 1/1990 |
| JP | 2009-091236 | A | | 4/2009 |
| JP | 2009-513709 | A | | 4/2009 |
| JP | WO2018079556 | A1 * | 5/2018 | |
| KR | 20190060793 | A | | 6/2019 |
| WO | WO-2018079556 | A1 * | 5/2018 | ............ C01B 33/26 |

OTHER PUBLICATIONS

Magnetic halloysite nanotubes iron oxide composites (Year: 2011).*

International Search Report and Written Opinion for International Application No. PCT/JP2020/040095, dated Jan. 12, 2021, 7 pages.

Ouadaker et al., "Porous Granules by Freeze Granulation of Pickering Emulsions Stabilized with Halloysite Particles", Colloids and Surfaces A, Oct. 31, 2019, vol. 585, 10 pages.

Wilson, I., "Kaolin and Halloysite Deposits of China", Clay Minerals, 2004, vol. 39, pp. 1-15.

Ouyang, J., et al., "High Morphological Stability and Structural Transition of Halloysite (Hunan, China), in Heat Treatment", Applied Clay Science, Elsevier, Amsterdam, NL, vol. 101, Sep. 16, 2014, pp. 16-22, XP029077975.

Extended European Search Report for European Application No. 20880553.1, dated Feb. 8, 2023, 7 pages.

Chinese Office Action with Search Report for Chinese Application No. 202080074618.6, dated Jun. 1, 2023, 7 pages.

Japanese Office Action for Japanese Application No. 2021-553599, dated Jun. 6, 2023 with Concise Statement of Relevance of Office Action, 4 pages.

Li et al., "Coal-series kaolinite and deep processing technology", China Building Materials Industry Press, 1st edition, 1st printing, (Jul. 2001), pp. 160-161 and its English translation.

Liu et al., "Testing methods and equipment for cement and raw fuel thereof", China Building Materials Industry Press, 1st edition, 1st printing, (Jun. 2009), p. 478 and its English translation.

Office Action issued Aug. 28, 2024, by the State Intellectual Property Office of People's Republic of China in corresponding Chinese Patent Application No. 202080074618.6 and an English machine translation with Concise Statement of Relevance of the Office Action. (17 pages).

European Communication pursuant to Article 94(3) for European Application No. 20 880 553.1, dated May 6, 2024, 5 pages.

Korean Office Action for Korean Application No. 10-2022-7013307, dated Apr. 25, 2024 with Concise Statement of Relevance of Office Action, 5 pages.

Yuan et al., "Changes in structure, morphology, porosity, and surface activity of mesoporous halloysite nanotubes under heating", Clays and Clay Minerals, (Dec. 1, 2012), vol. 60(6), pp. 561-573.

Notice of Allowance issued by the U.S. Patent and Trademark Office in the U.S. Appl. No. 16/344,650, mailed Sep. 20, 2021, U.S. Patent and Trademark Office, Alexandria, VA. (9 pages).

Office Action issued by the U.S. Patent and Trademark Office in the U.S. Appl. No. 16/344,650, mailed Jan. 14, 2021, U.S. Patent and Trademark Office, Alexandria, VA. (7 pages).

Office Action issued by the U.S. Patent and Trademark Office in the U.S. Appl. No. 17/049,443, mailed Jan. 18, 2024, U.S. Patent and Trademark Office, Alexandria, VA. (11 pages).

Office Action issued by the U.S. Patent and Trademark Office in the U.S. Appl. No. 17/049,438, mailed Mar. 7, 2024, U.S. Patent and Trademark Office, Alexandria, VA. (11 pages).

Office Action issued by the U.S. Patent and Trademark Office in the U.S. Appl. No. 17/049,443, mailed May 2, 2024, U.S. Patent and Trademark Office, Alexandria, VA. (7 pages).

Office Action issued by the U.S. Patent and Trademark Office in the U.S. Appl. No. 17/049,443, mailed Jun. 20, 2024, U.S. Patent and Trademark Office, Alexandria, VA. (10 pages).

Office Action issued by the U.S. Patent and Trademark Office in the U.S. Appl. No. 16/344,650, mailed Jun. 25, 2020, U.S. Patent and Trademark Office, Alexandria, VA. (8 pages).

Office Action issued by the U.S. Patent and Trademark Office in the U.S. Appl. No. 17/049,438, mailed Jul. 31, 2024, U.S. Patent and Trademark Office, Alexandria, VA. (11 pages).

Office Action issued by the U.S. Patent and Trademark Office in the U.S. Appl. No. 17/049,438, mailed Aug. 7, 2023, U.S. Patent and Trademark Office, Alexandria, VA. (8 pages).

Office Action issued by the U.S. Patent and Trademark Office in the U.S. Appl. No. 17/049,443, mailed Aug. 7, 2023, U.S. Patent and Trademark Office, Alexandria, VA. (8 pages).

Office Action issued by the U.S. Patent and Trademark Office in the U.S. Appl. No. 17/049,443, mailed Oct. 2, 2023, U.S. Patent and Trademark Office, Alexandria, VA. (13 pages).

Office Action issued by the U.S. Patent and Trademark Office in the U.S. Appl. No. 17/049,438, mailed Oct. 3, 2023, U.S. Patent and Trademark Office, Alexandria, VA. (13 pages).

Office Action issued by the U.S. Patent and Trademark Office in the U.S. Appl. No. 17/049,443, mailed Oct. 18, 2024, U.S. Patent and Trademark Office, Alexandria, VA. (11 pages).

Liu et al., "Recent Advance in Research on Halloysite Nanotubes-Polymemanocomposite", Progress in Polymer Science, (Aug. 2014), vol. 39, Issue 8, pp. 1498-1525.

Tan et al., "Natural Halloysite Nanotubes as Mesoporous Carriers for the Loading of Ibuprofen", Microporous and Mesoporous Materials, (Sep. 2013), vol. 179, pp. 89-98.

Zhang et al., "Metal Oxide Nanoparticles Deposited Onto Carbon-Coated Halloysite Nanotubes", Applied Clay Science, (Jun. 2014), vol. 95, pp. 252-259.

Zivica et al., "High Strength Metahalloysite Based Geopolymer", Composites: Part B, (Feb. 2014), vol. 57, pp. 155-165.

Matusik et al., "Surface Area and Porosity of Nanotubes Obtained from Kaolin Minerals of Different Structural Order", Clays and Clay Minerals, (Apr. 2011), vol. 59, No. 2, pp. 116-135.

Pasbakhsh et al., "Characterisation of Properties of Various Halloysites Relevant to their use as Nanotubes and Microfibre Fillers", Applied Clay Science, (Apr. 2013), vol. 74, pp. 47-57.

Office Action (Notice of Final Rejection) issued Oct. 18, 2024, by the Korean Intellectual Property Office in corresponding Korean Patent Application No. 10-2022-7013307 and an English translation with the Concise Statement of Relevance of Office Action. (8 pages).

* cited by examiner

HALLOYSITE POWDER

CROSS REFERENCE TO RELATED APPLICATIONS

This is the U.S. National Phase application of PCT/JP2020/040095, filed Oct. 26, 2020, which claims priority to Japanese Patent Application No. 2019-195020, filed Oct. 28, 2019, the Disclosures of these applications being incorporated herein by reference in their entireties for all purposes.

FIELD OF THE INVENTION

The present invention relates to halloysite powder.

BACKGROUND OF THE INVENTION

Patent Literature 1 describes "halloysite powder that is powder comprising a granule in which halloysite including halloysite nanotubes is aggregated, the granule having a first pore deriving from a tube hole of the halloysite nanotubes and a second pore different from the first pore" ("claim 1").

PATENT LITERATURES

Patent Literature 1: WO 2018/079556

SUMMARY OF THE INVENTION

The present inventor attempted development of the halloysite powder described in Patent Literature 1 (hereinafter, also simply referred to as "halloysite powder") in various applications. In this attempt, the present inventor found that some halloysite powder had yellowish color.

The yellowish halloysite may look like a stain when applied to, for example, a white member (such as cloth or a wall surface) and hence may cause a disadvantage for application development.

The present inventor thus continued the study and discovered that the yellowish halloysite powder has a large b value in the chromaticity coordinates of Hunter Lab color space (hereinafter, simply referred to as "b value").

Aspects of the present invention have been made in view of the above and aims at providing halloysite powder having a small b value.

The present inventor has made an intensive study to achieve the foregoing object. As a result, the present inventor has found that adjustment of a specific component content in halloysite powder would minimize the b value, thereby completing aspects of the present invention.

Specifically, aspects of the present invention provide the following [1] to [4].

[1] Halloysite powder that is powder comprising a granule in which halloysite including a halloysite nanotube is aggregated, wherein the granule includes a first pore deriving from a tube hole of the halloysite nanotube, and a second pore different from the first pore, and wherein a $Fe_2O_3$ content is not more than 2.00 mass %.

[2] The halloysite powder according to [1] above, wherein the $Fe_2O_3$ content is not less than 0.10 mass %.

[3] The halloysite powder according to [1] above, wherein the $Fe_2O_3$ content is not more than 1.50 mass %.

[4] The halloysite powder according to any one of [1] to [3] above, wherein a differential pore distribution determined from a nitrogen adsorption isotherm by BJH method exhibits two or more pore size peaks.

Aspects of the present invention can provide halloysite powder having a small b value.

DETAILED DESCRIPTION OF EMBODIMENTS OF THE INVENTION

Figure 1:
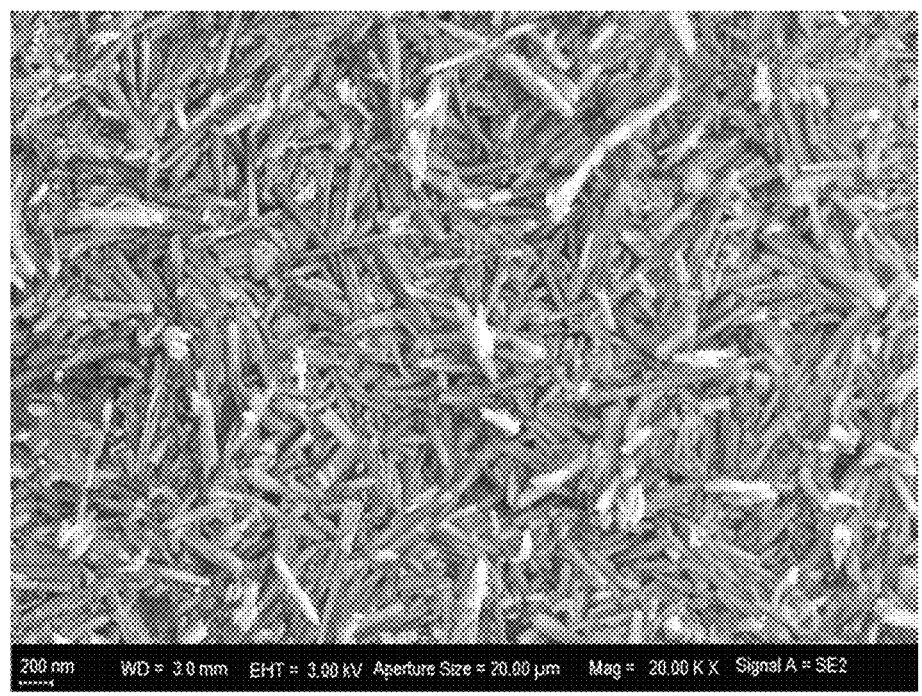
FIG. 1 is an SEM image showing granules in halloysite powder 1.

In the present specification, the numerical ranges indicated using "(from) . . . to . . . " include the former number as the lower limit value and the latter number as the upper limit value.

Halloysite Powder

The halloysite powder according to aspects of the invention is powder including a granule in which halloysite including halloysite nanotubes is aggregated, and the granule has a first pore deriving from a tube hole of the halloysite nanotubes and a second pore different from the first pore.

In the present specification, an aggregate of a plurality of "granules" is referred to as "powder."

$Fe_2O_3$ Content

The halloysite powder according to aspects of the invention has $Fe_2O_3$ content of not more than 2.00 mass %.

With this constitution, the b value (determination method thereof will be described later) is minimized, and yellowish color is reduced. While the reason therefor is not clear, it is assumed that presence of $Fe_2O_3$ is likely to exhibit yellowish color, and a small amount of $Fe_2O_3$ leads to a small b value.

Because the b value becomes smaller, the $Fe_2O_3$ content is preferably not more than 1.50 mass %, more preferably not more than 1.30 mass %, further preferably not more than 1.10 mass %, further more preferably not more than 0.70 mass %, particularly preferably not more than 0.50 mass %, and most preferably not more than 0.40 mass %.

The $Fe_2O_3$ content is determined through X-ray fluorescence (XRF) analysis. The $Fe_2O_3$ content is a 100%-normalized value excluding an ignition loss.

The specific conditions in the XRF analysis are as follows.

Instrument used: ZSX Primus IV (available from Rigaku Corporation)

Pretreatment method: Glass bead method using $Li_2B_4O_7$ flux

Quantitative method: Calibration curve method using standard sample (fireclay brick standard sample series) for X-ray fluorescence spectrometry of The Technical Association Of Refractories, Japan Meanwhile, the halloysite powder according to aspects of the invention preferably has the $Fe_2O_3$ content of not less than 0.10 mass %.

The reasons therefor include: that excessive reduction in the $Fe_2O_3$ content would require performing post-treatment such as acid treatment to the halloysite powder, thus increasing the cost; that post-treatment such as acid treatment may break the pore structure (e.g., the first pore and/or the second pore) of the halloysite powder; and that even if the $Fe_2O_3$ content is excessively reduced, the effect of minimizing the b value would be saturated.

Because of these reasons, the $Fe_2O_3$ content is more preferably not less than 0.12 mass %, and further preferably not less than 0.15 mass %.

The halloysite powder according to aspects of the invention has the first pore and the second pore as described above and thus can be developed for a wide variety of applications. Examples of the applications include, but are not limited to, cosmetics, humidity-controlling materials, deodorants, deodorizers, adsorbents, sustained-release agents, and antibacterial agents.

Even when the halloysite powder according to aspects of the invention is applied to a white member (such as cloth or a wall surface) in development for a variety of applications, the halloysite powder according to aspects of the invention can be prevented from appearing like a stain because the b value thereof is small.

Summary of Halloysite

Halloysite is a clay mineral represented by $Al_2Si_2O_5(OH)_4 \cdot 2H_2O$, or $Al_2Si_2O_5(OH)_4$.

Halloysite assumes various shapes such as a tubular shape (hollow tubular shape), a spherical shape, an angular lump shape, a plate-like shape, and a sheet-like shape.

The inner diameter of a halloysite nanotube (the diameter of a tube hole), which halloysite nanotube is a tube-shaped (hollow tube-shaped) halloysite, is approximately from 10 to 20 nm, for example. The outer surface of the halloysite nanotube is mainly composed of silicate ($SiO_2$), and the inner surface of the halloysite nanotube is mainly composed of alumina ($Al_2O_3$).

In the specification, "halloysite" includes "metahalloysite."

"Metahalloysite" is the dehydrated halloysite, i.e., halloysite represented by $Al_2Si_2O_5(OH)_4$ from which OH was removed to assume a low-crystalline form, and is a term that has been conventionally, generally or idiomatically used to refer to a variant of halloysite.

In the specification, "metahalloysite" is defined as "a product obtained by firing halloysite at a specific firing temperature." The "specific firing temperature" is, for example, not lower than 500° C., and preferably not lower than 600° C.

The upper limit of the "specific firing temperature" is not particularly limited and is preferably, for example, not higher than 900° C. Within the foregoing temperature range, the shape of halloysite nanotube (tubular shape) does not change.

XRD

Figure 3:
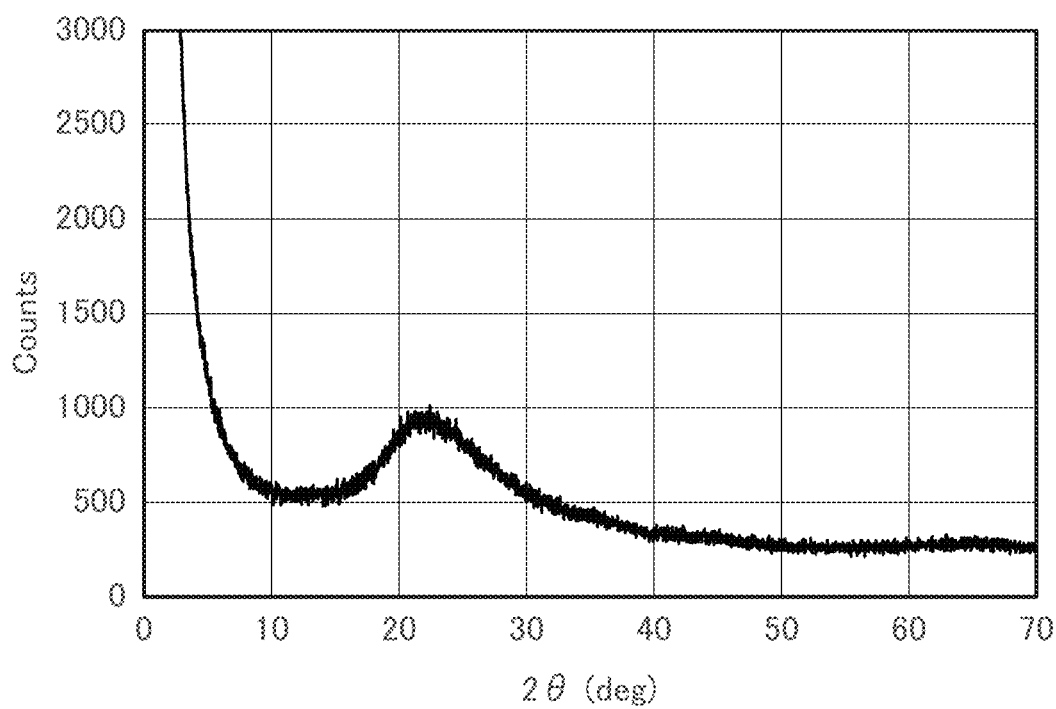
FIG. 3 is a graph showing the XRD pattern of the halloysite powder 1.

The halloysite powder according to aspects of the invention can be confirmed to have the halloysite crystal structure from, for example, the X-ray diffraction (XRD) measurement result (see FIG. 3).

FIG. 3 is a graph showing the XRD pattern of the halloysite powder according to aspects of the invention (halloysite powder 1 to be described later).

In the XRD pattern of the halloysite powder 1, a broad peak can be seen around $2\theta=20°$. Such the XRD pattern indicates the presence of metahalloysite.

The specific conditions in the XRD measurement are as follows.

Instrument used: X-ray diffractometer, D8ADVANCE (available from BRUKER CORPORATION)
X-ray tube: CuKα
Optical system: Bragg-Brentano geometry
Tube voltage: 35 kV
Tube current: 40 mA
Detector: One-dimensional semiconductor detector
Scan range: 2 to 70 deg
Scan step: 0.021 deg
Scan speed: 4 deg/min

SEM

In the Scanning Electron Microscope (SEM) image, for example, it can be confirmed that the granule included in the halloysite powder according to aspects of the invention is a granule in which halloysite including halloysite nanotubes is aggregated, and that the granule has a pore (first pore) deriving from the tube hole of the halloysite nanotubes (see FIG. 1).

FIG. 1 is the SEM image showing granules in the halloysite powder according to aspects of the invention (halloysite powder 1 described later).

In FIG. 1, it can be confirmed that halloysite including halloysite nanotubes is aggregated to form spherical granules. Further, in FIG. 1, the tube holes of the halloysite nanotubes (first pores deriving from the tube holes) can also be observed on the surfaces of the granules.

The reason why the granular structure including the first pore as above is obtained is probably because, for example, spray-drying a slurry including halloysite nanotubes allows the halloysite nanotubes to aggregate with their tube shape being maintained.

In addition, in FIG. 1, pores (second pores) with a larger size than that of the tube hole of the halloysite nanotube (normally, the inner diameter is approximately from 10 to 20 nm) can be observed on the surface of the granule (between halloysite nanotubes, in particular).

The reason why the second pore as above is obtained is probably because the dispersion medium of a slurry is evaporated and removed from the granule (inside of the granule) when the slurry is formed into granules by spray-drying or the like.

Pore Distribution Measurement

Figure 2:
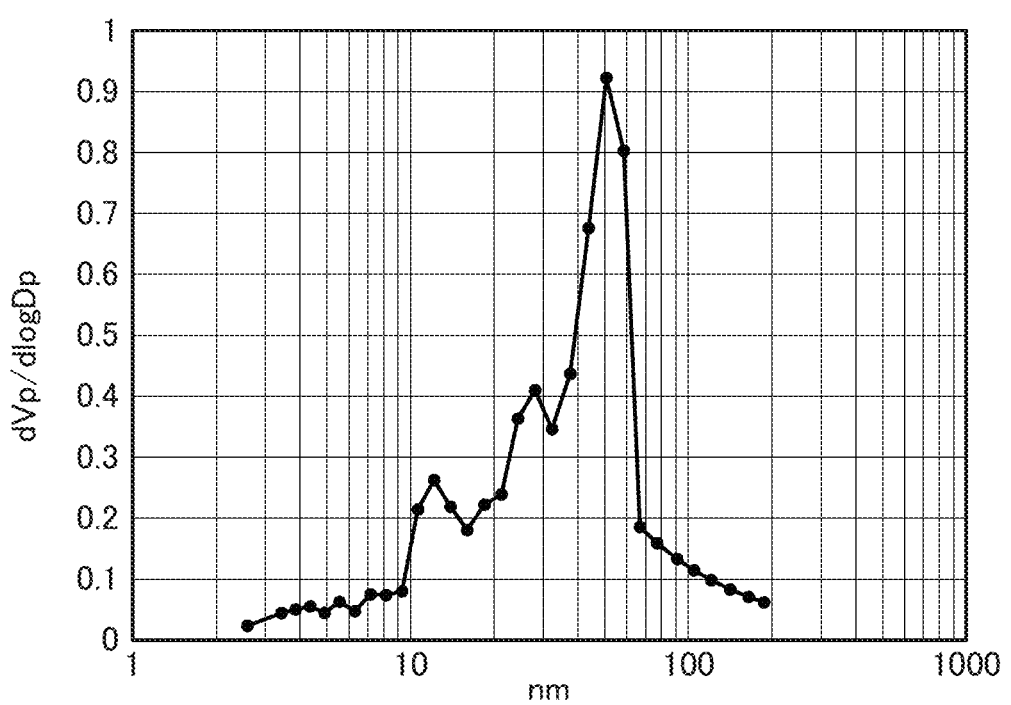
FIG. 2 is a graph showing the differential pore distribution of the halloysite powder 1.

The granule included in the halloysite powder according to aspects of the invention can be confirmed to have the specific structure as described above also from the pore distribution measurement result of the halloysite powder according to aspects of the invention (see FIG. 2).

It is more preferable that, of the halloysite powder according to aspects of the invention, the differential pore distribution (log differential pore volume distribution) determined from a nitrogen adsorption isotherm by the BJH method shows two or more pore size peaks. The details thereof will be described below.

FIG. 2 is a graph showing the differential pore distribution (log differential pore volume distribution) determined from a nitrogen adsorption isotherm by the BJH method for the halloysite powder according to aspects of the invention (halloysite powder 1 described later). The horizontal axis represents pore size (nm), and the vertical axis represents differential pore volume (dVp/d log Dp) ($cm^3/g$) (the same applies hereinafter).

The graph of FIG. 2 clearly shows two or more (three) pore size peaks.

More specifically, two or more (three) pore size peaks are clearly shown in the range of 10 nm or more (in particular, 10 to 100 nm, for example).

Further specifically, one pore size peak appears in the range of 10 nm or more and 20 nm or less, and two or more (two) pore size peaks appear in the range of more than 20 nm (in particular, more than 20 nm and 100 nm or less, for example).

Supposedly, the peak with the smaller pore size (pore size peak of 10 nm or more and 20 nm or less) represents the first pore deriving from the tube hole of the halloysite nanotubes (inner diameter: approximately 10 to 20 nm), and the peak with the larger pore size (pore size peak of more than 20 nm) represents the second pore different from the tube holes.

When including the second pore, the halloysite powder according to aspects of the invention has a large total pore area and a large total pore volume described later.

Specifically, the total pore area of the halloysite powder according to aspects of the invention is preferably not less than 59.0 $m^2/g$, more preferably not less than 65.0 $m^2/g$, and further preferably not less than 75.0 $m^2/g$. The upper limit thereof is not particularly limited and is, for example, not more than 200.0 $m^2/g$, and preferably not more than 150.0 $m^2/g$.

The total pore volume of the halloysite powder according to aspects of the invention is preferably not less than 0.20 $cm^3/g$, and more preferably not less than 0.23 $cm^3/g$. The upper limit thereof is not particularly limited and is, for example, not more than 0.80 $cm^3/g$, and preferably not more than 0.60 $cm^3/g$.

In addition, the average pore size of the halloysite powder according to aspects of the invention is, for example, not less than 5.0 nm, and preferably not less than 11.0 nm. The upper limit thereof is not particularly limited and is, for example, not more than 30.0 nm, and preferably not more than 20.0 nm.

The BET specific surface area (specific surface area determined by the BET method) of the halloysite powder according to aspects of the invention is, for example, 30 to 200 $m^2/g$, and preferably 50 to 150 $m^2/g$.

Next, the method of measuring the pore distribution and the like will be described.

Pretreatment (vacuum-deaeration at 120° C. for 8 hours) is first performed, and then a nitrogen adsorption-desorption isotherm is measured by a constant volume method under the following conditions. The equilibrium waiting time refers to the waiting time after reaching an adsorption equilibrium state.

The BET specific surface area ($m^2/g$) is determined by applying the BET method using the nitrogen adsorption isotherm.

The average pore size (nm) is calculated from the values of the BET specific surface area and the total pore volume ($cm^3/g$). The total pore volume used for calculation of the average pore size (for convenience, also referred to as "total pore volume for calculation") is determined from the adsorption amount at a relative pressure of 0.99 on the adsorption isotherm, assuming that capillary condensation occurs in pores that are present at relative pressures up to 0.99 on the adsorption isotherm.

Furthermore, the log differential pore volume distribution, the total pore volume ($cm^3/g$), and the total pore area ($m^2/g$) are determined by applying the BJH method using the FHH reference curve from the nitrogen adsorption isotherm. The standard conditions of analysis software are used for the plot intervals of the pores of approximately from 2.6 nm to 200 nm in size. Note that the total pore volume and the total pore area determined by the BJH method are respectively referred to as "BJH total pore volume" and "BJH total pore area."

In accordance with aspects of the present invention, in the case of simply referring to "total pore volume" and "total pore area", the "total pore volume" and the "total pore area" respectively mean the "BJH total pore volume" and the "BJH total pore area" unless noted otherwise.

Adsorption temperature: 77 K
    Nitrogen cross-sectional area: 0.162 $nm^2$
    Saturated vapor pressure: Measured
    Equilibrium waiting time: 500 sec
    Pretreatment instrument: BELPREP-vacII (available from MicrotracBEL Corp.)
    Measurement instrument: BELSORP-mini (available from MicrotracBEL Corp.)
    Analysis software: BELMaster Version 6.4.0.0 (available from MicrotracBEL Corp.)

Average Particle Size

The average particle size of the halloysite power according to aspects of the invention is not particularly limited and appropriately selected depending on the application. The average particle size is, for example, 0.5 to 200 μm. In a case where the halloysite powder according to aspects of the invention is prepared by spray-drying, the average particle size is preferably 1 to 100 μm.

The granules having such particle sizes may be increased in size through the granulation described above. Note that, in this case, the average particle size is preferably not greater than 5 mm.

Taking into account the size with which the granules can enter organs of respiration as a concern of harm, the granules preferably have the minimum size of not less than 1 μm.

The average particle size is dry-measured by using a laser diffraction-scattering type particle size distribution measuring apparatus (Microtrac MT3300EXII) available from MicrotracBEL Corp.

Method of Producing Halloysite Powder

Next, a method of producing the halloysite powder according to aspects of the invention (hereinafter, also referred to as "production method according to aspects of the invention" for convenience) is described.

The production method according to aspects of the invention preferably includes at least a step of preparing a slurry of halloysite including halloysite nanotubes (slurry preparation step), and a step of preparing powder from the slurry (powder preparation step).

Below, a preferred embodiment of the production method according to aspects of the invention is described.

Slurry Preparation Step

The slurry preparation step is not particularly limited as long as a slurry in which halloysite including halloysite nanotubes is dispersed in a dispersion medium such as water can be prepared.

A preferred embodiment of the slurry preparation step will be described below. In the embodiment described below, a dispersed phase recovered after centrifugation corresponds to a slurry prepared in the slurry preparation step.

Raw Material Halloysite

It is preferable that halloysite with the $Fe_2O_3$ content equivalent to that in the halloysite powder (halloysite powder according to aspects of the invention) to be finally obtained is used as a raw material (hereinafter, also referred to as "raw material halloysite"). In this manner, a need for acid treatment or the like for reducing the $Fe_2O_3$ content is eliminated. As a result, a cost increase or breakage of the halloysite nanotube structure due to acid treatment is avoided.

As the raw material halloysite, a commercially available halloysite (halloysite nanotubes) can be used, and, specifically, suitable examples thereof include "DRAGONITE-HP" and "DRAGONITE Pure-White" (both available from APPLIED MINERALS INC.).

Preparation of Slurry

Next, a slurry in which the raw material halloysite is dispersed in water is prepared. The method of dispersing the raw material halloysite in water is not particularly limited, and, for example, known apparatuses such as a high-speed mixer, a disperser, a bead mill, and a homomixer can be used.

The solid content concentration of the slurry is not particularly limited and is, for example, 30 to 50 mass %.

For its large influence on the precision of centrifugation described later, a dispersant is preferably added to the slurry. Addition of a dispersant enables to obtain a slurry having a higher concentration and thus provides an effect of enhancing productivity in drying using, for instance, a spray-dryer described later.

Regarding the dispersant, it is preferable that a stable slurry can be obtained with use of a small amount of the dispersant, and examples thereof include a polymer anionic surfactant (anionic polymeric surfactant).

Specific examples of the anionic polymeric surfactant include POIZ 520, 521, 530, and 532A (available from Kao Corporation), which are special polycarboxylate type surfactants.

KAOCER 2000, 2020, 2110 (available from Kao Corporation), or the like, which includes no metal ion such as sodium or potassium, may be used depending on the application.

Not only polycarboxylate type surfactants but surfactants of other types such as acrylate type and sulfonate type can be used.

The dispersant content is not particularly limited and is preferably, for example, 0.5 to 3.0 mass % relative to the total solid content in the slurry.

When the dispersant content is too small, dispersion of particles of halloysite and impurities in the slurry may be insufficient. On the other hand, when the dispersant content is too large, the dispersant may cause aggregation or costs may increase. In such a case, the dispersant may further cause problems in subsequent processes (for example, decrease in recovery rate of a dispersed phase in centrifugation, insufficient drying in spray-drying, or insufficient compaction or burning in firing).

Removal of Coarse Particles

In order to improve the precision of the centrifugation described later, coarse particles may be removed from the slurry. For removal of coarse particles, for example, a sieve having an aperture of 25 to 100 μm or a wet type cyclone is used. Other than the above, coarse particles may be removed by subjecting the slurry to natural sedimentation separation.

Centrifugation

The obtained slurry is subjected to centrifugation, thereby being separated into a sedimented phase of a lower layer and a dispersed phase of an upper layer. The sedimented phase includes a large amount of fine sand or other impurities, and the dispersed phase includes a large amount of halloysite nanotubes. The solid content concentration of the dispersed phase (slurry) is, for example, 10 to 30 mass %.

The centrifugal force and treatment time for centrifugation are, for example, 2000 to 3000 G and 3 to 30 minutes, respectively, but are not limited to these numerical ranges. They are appropriately determined taking into account a dispersion state, application, costs, and the like.

A large-size centrifugal separator can be used for mass production.

The dispersed phase is recovered, whereby halloysite nanotubes can be purified and separated from the raw material halloysite including fine sand or other impurities.

The dispersed phase slurry in the slurry preparation step can be additionally subjected to purification, classification, magnetic separation or concentration as necessary.

Powder Preparation Step

The powder preparation step is a step of preparing powder from the slurry prepared in the slurry preparation step.

The powder obtained in the powder preparation step may be granulated by further performing treatments such as tumbling, stirring, and extruding. Thus, granules constituting the powder can be increased in size.

Spray-Drying

Examples of the powder preparation step include a step of spray-drying the slurry prepared in the slurry preparation step (for example, the foregoing dispersed phase obtained by centrifugation) to obtain powder.

The prepared slurry is spray-dried using a spray-dryer that is an apparatus that instantly produces powder by spraying slurry in the form of minute droplets (i.e., forming fine particles) and drying the droplets through application of hot air. The spray-dryer is a known apparatus, and examples thereof include spray-dryers available from Ohkawara Kakohki Co., LTD., Fujisaki Electric Co., LTD., Japan Chemical Engineering & Machinery Co., Ltd., and Yamato Scientific Co., Ltd.

In the spray-dryer, the size of powder particles (granules) obtained by drying can be controlled by changing the size of droplets obtained by spraying a liquid raw material (i.e., forming fine particles).

The method of forming the liquid raw material into fine particles by using a spray-dryer is not particularly limited. For example, a known method such as a two-fluid nozzle method, a pressure nozzle (compression nozzle) method, a four-fluid nozzle method (twin-jet nozzle method), or a rotating disc method can be appropriately selected according to the size of droplets desired. The size of powder particles (granules) obtained by drying depends on, for example, the concentration of the slurry and/or the amount of the slurry to be treated. Thus, in addition to selecting an appropriate method for forming fine particles, the state of the slurry is appropriately selected to achieve a desired particle size.

For the method of bringing sprayed droplets into contact with hot air, a typically-employed concurrent flow method in which both of hot air and sprayed droplets are directed downward; a countercurrent flow method in which sprayed droplets are directed downward and the hot air is directed upward, that is, the flows of the hot air and sprayed droplets are countercurrents; a mixed flow method in which sprayed droplets are directed upward and hot air is directed downward; and the like are appropriately selected.

In spray-drying, heat is instantaneously applied, and therefore the powder itself does not reach a high temperature. In spray-drying, the powder is directly obtained by drying the slurry, and therefore treatments such as filtering, drying, and pulverizing are eliminated, preventing contamination that may occur during a series of the operations.

Media Fluidized Drying

As long as the halloysite powder according to aspects of the invention can be obtained, the method of preparing powder from the slurry is not limited to the spray-drying described above, and for example, media fluidized drying (drying using a fluidized bed including balls) may be employed.

That is, the powder preparation step may be a step of media-fluidized-drying the slurry prepared in the slurry preparation step to obtain powder.

In summary, the media fluidized drying involves, for example, continuously supplying a slurry to be dried into a layer of ceramic balls (φ 1 to 3 mm) in a fluidized state, and thus adhering the slurry on the surfaces of the balls. Objects to be dried are instantly dried by heat conduction from the heated balls and convective heat transfer from fluidization hot air, and then peeled off from the surfaces of the balls by collision among the balls. The powder is thus obtained.

Firing Step

The method of producing the halloysite powder according to aspects of the invention may further include a step (firing step) of firing the powder obtained in the powder preparation step.

In a case where a dispersant such as a surfactant is used for preparation of the slurry described above, the dispersant may also remain in the powder obtained by spray-drying or the like. The firing step provides an effect that the dispersant can be removed by performing firing.

The firing temperature is preferably temperature at which the halloysite or metahalloysite crystal structure is maintained at the time of the XRD measurement after firing. Specifically, the firing temperature is preferably not lower than 200° C., more preferably not lower than 300° C., and further preferably not lower than 400° C. Meanwhile, the firing temperature is preferably not higher than 900° C., more preferably not higher than 800° C., and further preferably not higher than 700° C.

The firing time is preferably not less than 0.5 hours, and more preferably not less than 0.75 hours. Meanwhile, the firing time is preferably not more than 2 hours, and more preferably not more than 1.5 hours.

When the production method according to aspects of the invention does not include the firing step, the powder obtained in the powder preparation step is the halloysite powder according to aspects of the invention.

In the meantime, when the production method according to aspects of the invention includes the firing step, the powder having been fired in the firing step is the halloysite powder according to aspects of the invention.

EXAMPLES

Aspects of the invention are specifically described below with reference to Examples. However, the present invention should not be construed as being limited to the following examples.

Test 1

Preparation of Halloysite Powder 1

Halloysite powder 1 (corresponding to the "halloysite powder according to aspects of the invention" described above) to be used in each of Examples was produced as described below.

Raw Material Halloysite

As raw material halloysite, halloysite (trade name: DRAGONITE-HP) available from APPLIED MINERALS INC. was prepared.

Preparation of Slurry

The raw material halloysite, water, and an anionic polymeric surfactant (POIZ 520, available from Kao Corporation) were charged into a high-speed mixer (Ultra Homomixer UHM-20 (20 L), available from NISSEI Corporation) and were subjected to treatment for 10 minutes at 10,000 rpm, whereby a slurry in which the raw material halloysite was dispersed in water (solid content concentration: 40 mass %) was obtained. The content of the anionic polymeric surfactant relative to the total solid content of the slurry was 1.5 mass %.

Centrifugation

Using a centrifugal separator (small-size desktop centrifugal machine H-19α, available from Kokusan Corp.), centrifugation was performed at a centrifugal force of 2470 G for 10 minutes to separate the slurry into a sedimented phase and a dispersed phase, and the dispersed phase was recovered. The solid content concentration of the recovered dispersed phase (slurry) was 26 mass %.

Spray-Drying

The recovered dispersed phase (slurry) was spray-dried by using a spray-dryer, and powder (halloysite powder) was obtained.

Using the spray-dryer L-8i available from OHKAWARA KAKOHKI CO., LTD. as the spray-dryer, the slurry was dispensed to the spray-dryer with a pump at a constant volume and formed into fine particles (sprayed). As the method of bringing sprayed droplets into contact with hot air, the concurrent flow method in which both of hot air and sprayed droplets are directed downward was used.

In this process, the spray-drying conditions shown in Table 1 below were adopted. Table 1 below also shows the spray-drying conditions for halloysite powder X1 to be described later.

TABLE 1

| | Spray-drying conditions | | | | |
| --- | --- | --- | --- | --- | --- |
| | Fine particle formation method | Spraying air pressure [MPa] | Amount of moisture evaporation [kg/h] | Inlet temp. [° C.] | Outlet temp. [° C.] |
| Halloysite powder 1 | Four-fluid method nozzle | 0.20 | 2.00 | 190 | 88 |
| Halloysite powder X1 | | 0.25 | 2.60 | 190 | 67 |

Firing

The powder having been spray-dried was fired at firing temperature of 800° C.

Specifically, the powder having been spray-dried was heated by an electric furnace utilizing Siliconit heating elements, with the temperature increasing from room temperature at a temperature increase rate of 5° C./min. and being maintained at 800° C. for 1 hour, and thereafter the powder was cooled in the furnace. When the temperature was increased and maintained at the firing temperature, in order to promote burning off of the surfactant, ventilation was performed while a certain amount of air was supplied into the furnace.

Removal of the surfactant from the fired powder was confirmed through TG-DTA (thermogravimetry-differential thermal analysis).

Preparation of Halloysite Powder X1

The dispersed phase (slurry) recovered in the same manner as in Examples 1 to 8 of Patent Literature 1 was spray-dried under the spray-drying conditions shown in Table 1 above, whereby powder was obtained. Subsequently, the powder was fired at 800° C. as with the halloysite powder 1, whereby the halloysite powder X1 was obtained.

Raw material halloysite for the halloysite powder X1 was a clay component (referred to as "Iide clay" for convenience) produced as a by-product in the process of purifying silica sand in the Osodani factory of the Iide mining works of JFE MINERAL Co., LTD.

Evaluations of Halloysite Powder 1 and Halloysite Powder X1

The halloysite powder 1 and the halloysite powder X1 were evaluated as follows.

XRD

The halloysite powder 1 and the halloysite powder X1 were subjected to XRD measurement. The measurement conditions are as described above.

FIG. 3 is a graph showing the XRD patterns of the halloysite powder 1. As shown in FIG. 3, a broad peak was seen around 2θ=20° in the XRD pattern of the halloysite powder 1. Such XRD pattern indicates presence of metahalloysite.

The same was confirmed in the halloysite powder X1.

SEM

SEM images of the halloysite powder 1 and the halloysite powder X1 were taken.

FIG. 1 is an SEM image showing granules of the halloysite powder 1.

From the SEM image in FIG. 1, it was confirmed that the halloysite powder 1 included a granule in which halloysite including halloysite nanotubes is aggregated, and that pores (first pores) deriving from tube holes of halloysite nanotubes were present on the granule surface. It was also confirmed that pores (second pores) with a larger size than that of the tube holes of halloysite nanotubes were present in a cross-section of the granule.

The same was confirmed in the halloysite powder X1.

Pore Distribution Measurement

The nitrogen adsorption-desorption isotherms of the halloysite powder 1 and the halloysite powder X1 were measured. The measurement conditions are as described above.

FIG. 2 is a graph showing the differential pore distribution of the halloysite powder 1 determined from the nitrogen adsorption isotherms by the BJH method. In each graph, the horizontal axis represents pore size (nm), and the vertical axis represents differential pore volume (dVp/d log Dp) (cm$^3$/g). In the graph in FIG. 2, two or more pore size peaks were observed in the range of 10 nm or more (10 to 100 nm).

The same was confirmed in the halloysite powder X1.

Along with the pore distribution measurement, the BJH total pore area, the BJH total pore volume, the BET specific surface area, the total pore volume for calculation, and the average pore size were determined for the halloysite powder 1 and the halloysite powder X1. The results are shown in Table 2 below.

Average Particle Size

The average particle sizes of the halloysite powder 1 and the halloysite powder X1 were measured. The results are shown in Table 2 below.

TABLE 2

| | BJH total pore area [m$^2$/g] | BJH total pore volume [cm$^3$/g] | BET specific surface area [m$^2$/g] | Total pore volume for calculation [cm$^3$/g] | Average pore size [nm] | Average particle size [μm] |
|---|---|---|---|---|---|---|
| Halloysite powder 1 | 77.9 | 0.42 | 60.8 | 0.41 | 27.0 | 5.7 |

TABLE 2-continued

| | BJH total pore area [m$^2$/g] | BJH total pore volume [cm$^3$/g] | BET specific surface area [m$^2$/g] | Total pore volume for calculation [cm$^3$/g] | Average pore size [nm] | Average particle size [μm] |
|---|---|---|---|---|---|---|
| Halloysite powder X1 | 91.4 | 0.37 | 73.0 | 0.36 | 19.8 | 4.2 |

$Fe_2O_3$ Content

Hereinafter, the halloysite powder 1 and the halloysite powder X1 are referred to as "halloysite powder of Example 1" and "halloysite powder of Example 7," respectively.

The $Fe_2O_3$ content in each of the halloysite powder of Example 1 and the halloysite powder of Example 7 was measured. The measurement conditions are as described above. The results are shown in Table 3 below.

In addition, the halloysite powders of Example 1 and the halloysite powder of Example 7 were mixed, and halloysite powders of Example 2 to Example 6 having different mixing ratios were obtained. The $Fe_2O_3$ content in each of the halloysite powders of Example 2 to Example 6 was determined through calculation based on the mixing ratio. The results are shown in Table 3 below.

b Value

Of the halloysite powder of each of Example 1 to Example 7, the b value in the chromaticity coordinates of Hunter Lab color space and other color values as described below were determined.

Using a device constitution including a spectrophotometer (V-770), an integrating sphere unit (ISN-923) and a powder cell (PSH-002) available from JASCO Corporation, a reflection spectrum at in a wavelength range of 380 to 780 nm was measured. Based on the measurement data, color computation program of an attached software was implemented to determine various values with a D65 light source.

The results are shown in Table 3 below. In order to reduce yellowish color, the b value is preferably not larger than 15.

Tristimulus values of XYZ color space: X, Y, Z
Chromaticity coordinates of XYZ color space: x, y
Lightness index of Hunter Lab color space: L
Chromaticity coordinates of Hunter Lab color space: a, b
Lightness index of L*a*b* color space: L*
Chromaticity coordinates of L*a*b* color space: a*, b*
Chromaticity coordinates of L*u*v* color space: u*, v*
ab chroma of L*C*h color space: C*
ab hue angle of L*C*h color space: h

TABLE 3

| | Examples | | | | | | |
|---|---|---|---|---|---|---|---|
| | 1 | 2 | 3 | 4 | 5 | 6 | 7 |
| $Fe_2O_3$ content [mass %] | 0.32 | 0.45 | 0.64 | 1.21 | 2.58 | 3.74 | 4.45 |
| X | 59.45 | 55.20 | 51.74 | 46.54 | 40.13 | 36.77 | 36.05 |
| Y | 61.96 | 56.70 | 52.59 | 46.27 | 38.76 | 34.94 | 34.09 |
| Z | 60.91 | 52.17 | 45.54 | 35.57 | 25.20 | 20.89 | 19.49 |
| x | 0.3261 | 0.3364 | 0.3452 | 0.3625 | 0.3856 | 0.3971 | 0.4022 |
| y | 0.3399 | 0.3456 | 0.3509 | 0.3604 | 0.3724 | 0.3744 | 0.3803 |
| L | 78.72 | 75.30 | 72.52 | 68.02 | 62.35 | 59.11 | 58.39 |
| a | 1.28 | 3.14 | 4.39 | 6.84 | 9.59 | 10.91 | 11.34 |
| b | 5.14 | 7.84 | 9.97 | 13.44 | 16.86 | 17.92 | 18.64 |
| L* | 82.89 | 80.01 | 77.63 | 73.72 | 68.57 | 65.70 | 65.04 |
| a* | 1.34 | 3.31 | 4.68 | 7.38 | 10.56 | 12.15 | 12.66 |

TABLE 3-continued

|     | Examples |       |       |       |       |       |       |
| --- | -------- | ----- | ----- | ----- | ----- | ----- | ----- |
|     | 1        | 2     | 3     | 4     | 5     | 6     | 7     |
| b*  | 5.71     | 9.03  | 11.86 | 16.94 | 23.03 | 25.52 | 27.00 |
| u*  | 5.52     | 10.42 | 14.08 | 20.98 | 28.92 | 32.48 | 33.98 |
| v*  | 8.23     | 12.56 | 16.15 | 22.17 | 28.57 | 30.74 | 32.18 |
| C*  | 5.87     | 9.62  | 12.75 | 18.48 | 25.33 | 28.27 | 29.82 |
| h   | 76.84    | 69.85 | 68.48 | 66.46 | 65.36 | 64.55 | 64.88 |

Summary of Evaluation Results

As shown in Table 3 above, the halloysite powder of each of Example 1 to Example 4 having the $Fe_2O_3$ content of 0.32 to 1.21 mass % had a small b value of not larger than 15.

Appearance of the halloysite of each of Example 1 to Example 7 was visually checked. As a result, the halloysite powders of Example 5 to Example 7 exhibited relatively strong yellowish color. On the other hand, yellowish color was weak in the halloysite of Example 1 to Example 4; it could be deduced that the halloysite would not cause a disadvantage in applications.

Test 2

In Test 2, the same evaluation as in Test 1 described above was performed except that the firing temperature in the firing step after spray-drying was changed to 400° C.

Preparation of Halloysite Powder 2 and Halloysite Powder X2

Prepared was halloysite powder 2 (using "DRAGONITE-HP") corresponding to halloysite obtained by changing the firing temperature of 800° C. in the case of the foregoing halloysite powder 1 to 400° C.

Similarly, prepared was halloysite powder X2 (using "Iide clay") corresponding to halloysite obtained by changing the firing temperature of 800° C. in the case of the foregoing halloysite powder X1 to 400° C.

Both of the halloysite powder 2 and the halloysite powder X2 showed two or more pore size peaks in the range of 10 nm or more (10 to 100 nm) in a graph showing the differential pore size distribution that was obtained from a nitrogen adsorption isotherm by the BJH method.

$Fe_2O_3$ Content and b Value

Hereinafter, the halloysite powder 2 and the halloysite powder X2 are referred to as "halloysite powder of Example 8" and "halloysite powder of Example 13," respectively.

The halloysite powder of Example 8 and the halloysite powder of Example 13 were mixed, and halloysite powders of Example 9 to Example 12 having different mixing ratios were obtained.

Of the halloysite powder of each of Example 8 to Example 13, the $Fe_2O_3$ content as well as the b value in the chromaticity coordinates of Hunter Lab color space and other color values were determined. The results are shown in Table 4 below.

TABLE 4

|                              | Examples |      |      |      |      |      |
| ---------------------------- | -------- | ---- | ---- | ---- | ---- | ---- |
|                              | 8        | 9    | 10   | 11   | 12   | 13   |
| $Fe_2O_3$ content [mass %]   | 0.32     | 0.49 | 0.66 | 1.03 | 1.44 | 4.45 |

TABLE 4-continued

|     | Examples |        |        |        |        |        |
| --- | -------- | ------ | ------ | ------ | ------ | ------ |
|     | 8        | 9      | 10     | 11     | 12     | 13     |
| X   | 38.48    | 38.71  | 38.13  | 37.23  | 35.86  | 32.25  |
| Y   | 39.72    | 39.93  | 39.15  | 37.98  | 36.27  | 31.28  |
| Z   | 38.15    | 37.78  | 35.61  | 33.02  | 29.70  | 19.37  |
| x   | 0.3307   | 0.3325 | 0.3378 | 0.3440 | 0.3522 | 0.3890 |
| y   | 0.3414   | 0.3430 | 0.3468 | 0.3510 | 0.3562 | 0.3773 |
| L   | 63.02    | 63.19  | 62.57  | 61.63  | 60.23  | 55.93  |
| a   | 2.10     | 2.19   | 2.69   | 3.30   | 4.18   | 8.16   |
| b   | 4.99     | 5.56   | 6.92   | 8.36   | 10.05  | 16.21  |
| L*  | 69.27    | 69.42  | 68.86  | 68.01  | 66.73  | 62.74  |
| a*  | 2.36     | 2.45   | 3.02   | 3.72   | 4.72   | 9.32   |
| b*  | 6.02     | 6.73   | 8.51   | 10.48  | 12.93  | 23.28  |
| u*  | 6.98     | 7.55   | 9.40   | 11.55  | 14.38  | 26.66  |
| v*  | 8.20     | 9.18   | 11.51  | 14.02  | 17.01  | 28.36  |
| C*  | 6.46     | 7.16   | 9.02   | 11.12  | 13.77  | 25.08  |
| h   | 68.63    | 69.98  | 70.46  | 70.47  | 69.94  | 68.18  |

Summary of Evaluation Results

As shown in Table 4 above, the halloysite powder of each of Example 8 to Example 12 having the $Fe_2O_3$ content of 0.32 to 1.44 mass % had a small b value of not larger than 15.

The halloysite powder of Example 13 had relatively strong yellowish color. On the other hand, yellowish color was weak in the halloysite of Example 8 to Example 12; it could be deduced that the halloysite would not cause a disadvantage in applications.

The invention claimed is:

1. Halloysite powder that is powder comprising a granule in which halloysite including a halloysite nanotube is aggregated,
    wherein the halloysite includes metahalloysite obtained by firing halloysite at a temperature not lower than 500° C.,
    wherein the granule includes a first pore deriving from a tube hole of the halloysite nanotube, and a second pore different from the first pore,
    wherein the halloysite powder comprises $Fe_2O_3$ in an amount more than 0% and not more than 2.00 mass %, and
    wherein the halloysite powder has a b value of not larger than 15.

2. The halloysite powder according to claim 1, wherein the $Fe_2O_3$ content is not less than 0.10 mass % and not more than 2.00 mass %.

3. The halloysite powder according to claim 2, wherein a differential pore distribution determined from a nitrogen adsorption isotherm by BJH method exhibits two or more pore size peaks.

4. The halloysite powder according to claim 1, wherein the $Fe_2O_3$ content is more than 0% and not more than 1.50 mass %.

5. The halloysite powder according to claim 4, wherein a differential pore distribution determined from a nitrogen adsorption isotherm by BJH method exhibits two or more pore size peaks.

6. The halloysite powder according to claim 1, wherein a differential pore distribution determined from a nitrogen adsorption isotherm by BJH method exhibits two or more pore size peaks.

* * * * *